United States Patent [19]
Wilder

[11] Patent Number: 5,539,599
[45] Date of Patent: Jul. 23, 1996

[54] FASTENER FOR FLEXIBLE DISK CARTRIDGES

[75] Inventor: Robert E. Wilder, Arlington, Va.

[73] Assignee: Blue Ridge Group, L.L.C., Arlington, Va.

[21] Appl. No.: 283,593

[22] Filed: Aug. 1, 1994

[51] Int. Cl.$^6$ .................. G11B 23/03; B65D 21/032; F16B 12/00

[52] U.S. Cl. .................. 360/133; 360/97.01; 360/99.01; 369/291; 206/308.3; 206/506; 206/509; 403/381; 403/386; 403/409.1; 312/111

[58] Field of Search ............................. 360/97.01, 97.04, 360/98.01, 98.02, 99.01, 131–133; 369/291; 206/308.3, 309, 512; 312/9.47, 9.56, 9.58, 9.61, 111; 403/381, 384, 386, 409.1

[56] References Cited

U.S. PATENT DOCUMENTS

| | | | |
|---|---|---|---|
| 2,561,561 | 7/1951 | Cella | 206/512 |
| 3,481,656 | 12/1969 | Landers | 312/9.27 |
| 3,547,472 | 6/1968 | Ehrman | 403/381 |
| 3,635,608 | 1/1972 | Crouch et al. | 360/133 |
| 3,845,502 | 10/1974 | Paus | 360/86 |
| 4,069,914 | 1/1978 | Damsky | 206/303 |
| 4,089,414 | 5/1978 | Sandor et al. | 206/308.3 |
| 4,177,899 | 12/1979 | Green et al. | 206/509 |
| 4,247,004 | 1/1981 | Bird | 206/506 |
| 4,309,821 | 1/1982 | Terry et al. | 30/32 |
| 4,423,813 | 1/1984 | Kreeger et al. | 206/506 |
| 4,492,417 | 1/1985 | Saito et al. | 312/111 |
| 4,504,168 | 3/1985 | Miller | 403/353 |
| 4,626,155 | 12/1986 | Hlinsky et al. | 312/111 |
| 4,643,310 | 2/1987 | Deaton et al. | 206/506 |
| 4,838,422 | 6/1989 | Gregerson | 206/503 |
| 4,896,926 | 1/1990 | Verholt | 312/111 |
| 4,955,159 | 9/1990 | Rogers | 49/161 |
| 5,007,146 | 4/1991 | Meidan | 24/683 |
| 5,059,074 | 10/1991 | Guevarra et al. | 411/107 |
| 5,076,434 | 12/1991 | Hoffman, Jr. | 206/509 |
| 5,083,666 | 1/1992 | Lam | 206/506 |
| 5,186,345 | 2/1993 | Ching An | 220/23.4 |
| 5,203,452 | 4/1993 | Small et al. | 206/329 |
| 5,209,424 | 5/1993 | Fischer et al. | 242/348 |
| 5,325,966 | 7/1994 | Chang | 206/372 |
| 5,360,107 | 11/1994 | Chasin et al. | 206/308.1 |

(List continued on next page.)

FOREIGN PATENT DOCUMENTS

| | | | |
|---|---|---|---|
| 330573 | 8/1989 | European Pat. Off. | 206/503 |
| 0592872 | 4/1994 | European Pat. Off. | 360/133 |
| 2039696 | 2/1972 | Germany | 312/111 |
| 4201264 | 7/1993 | Germany | 206/503 |
| 62-184678 | 8/1987 | Japan | 360/133 |
| 63-234481 | 9/1988 | Japan | 360/133 |
| 4-46210 | 2/1992 | Japan | 403/381 |
| 7502221 | 8/1976 | Netherlands . | |
| 2064699 | 6/1981 | United Kingdom . | |
| 2115099 | 9/1983 | United Kingdom | 403/381 |
| 8911719 | 11/1989 | WIPO . | |
| 9222903 | 12/1992 | WIPO . | |

OTHER PUBLICATIONS

IBM Technical Disclosure Bulletin; Cox et al; vol. 17, No. 12, May 1975; "Container for Recording Disk".

"Music Firms Try Out 'Green' CD Boxes," *Wall Street Journal*, Meg Cox, Aug. 1991, p. B1.

*APS Technologies*, Jun. 1994, cover and p. 24, Lock●N●Go™.

Primary Examiner—Stuart S. Levy
Assistant Examiner—Jefferson Evans
Attorney, Agent, or Firm—Baker & Botts

[57] ABSTRACT

A movable fastener that permits, among other things, the interlocking of 3.5 inch flexible disk cartridges or "floppy disks." The fastener can project from the flexible disk cartridge when desired to fasten to another flexible disk cartridge. The fastener can be placed anywhere within the flexible disk cartridge where it will not interfere with the magnetic media, the shutter, the write protect hole and tab, the disk size indicator, or any other feature integral to the proper functioning of the flexible disk cartridge. Mortise and tenon, interference, and friction fit type fastener configurations are disclosed.

47 Claims, 8 Drawing Sheets

U.S. PATENT DOCUMENTS

| | | | |
|---|---|---|---|
| 5,366,073 | 11/1994 | Turrentine et al. | 206/509 |
| 5,383,630 | 1/1995 | Flatten | 244/118.6 |
| 5,415,255 | 5/1995 | Hafner | 206/503 |
| 5,425,450 | 6/1995 | Lin | 206/310 |
| 5,433,416 | 7/1995 | Johnson | 403/381 |
| 5,439,310 | 8/1995 | Evenson et al. | 403/321 |
| 5,452,803 | 9/1995 | Stromberg | 206/507 |
| 5,452,975 | 9/1995 | Grant | 411/22 |
| 5,462,188 | 10/1995 | Yurgevich | 206/512 |

FASTENER FOR FLEXIBLE DISK CARTRIDGES

FIELD OF THE INVENTION

The invention relates generally to fasteners and, more specifically, to fasteners for fastening together objects such as two or more flexible disk cartridges.

BACKGROUND OF THE INVENTION

Fasteners, in general, are well known. Also generally known are fasteners for fastening together objects, where each object includes a male portion and a complementary-shaped, female portion and the male portion engages the female portion to fasten or interlock the objects. Typically, the male portion is immovably attached to the object and protrudes therefrom. This is acceptable for certain objects, but is not acceptable for others. For example, the use of a permanently protruding male portion on a flexible disk cartridge or "floppy disk" could interfere with the ability to insert or eject the flexible disk cartridge into or from a disk drive mechanism. This is obviously undesirable. When it is desired to fasten together two or more flexible disks cartridges, it is typical to use a rubber band or place the flexible disk cartridges into a holder, for example, a floppy disk storage case. Several drawbacks exist to these and other fastening methods. For example, rubber bands break and flexible disk cartridges can slip out of a stack if the rubber band is not tight enough. Flexible disk cartridge holders increase the user's cost, can be unnecessarily bulky, and accommodate only a limited number of flexible disk cartridges. Furthermore, these fastening methods require products (e.g., rubber bands or floppy disk storage cases) in addition to the flexible disk cartridges or other objects to be fastened together. This is inconvenient and can add additional expense. Other drawbacks also exist.

SUMMARY OF THE INVENTION

It is one object of the present invention to overcome these and other drawbacks of the prior art. More specifically, it is an object of the invention to provide a fastener for fastening together flexible disk cartridges or other objects without the need for additional products.

It is another object of the invention to provide a fastener for flexible disk cartridges or other objects to enable fastening of the flexible disk cartridges or other objects while avoiding interference with the normal operation or use of the flexible disk cartridges or objects.

More specifically, it is an object of the invention to provide a fastener for selectively fastening two or more flexible disk cartridges or other objects without using additional products, that avoids interference with the normal operation or use of the cartridges or objects, and that is strong, simple, and inexpensive.

It is another object of the present invention to provide a fastener for interlocking flexible disk cartridges or other objects with the fastener having a male portion and a complementary-shaped, female portion, where at least one of said portions is movable with respect to the housing for the flexible disk cartridge or object.

It is another object of the invention to provide a fastener for flexible disk cartridges or other objects that includes at least one portion that is either manually or automatically movable from a projecting position to a non-projecting position and vice versa.

It is yet another object of the invention to provide a plurality of flexible disk cartridges or other objects, where each flexible disk cartridge or other object is provided with a first fastener portion and a complementary-shaped, second fastener portion to enable two or more of the flexible disk cartridges or objects to be fastened together by engaging the first fastener portion of a first flexible disk cartridge or object with a second fastener portion of a second flexible disk cartridge or object.

For simplicity, the invention will be described with respect to flexible disk cartridges. It is to be understood, however, that the fasteners and fastening techniques of the present invention are applicable to other types of objects as well.

To accomplish the foregoing and other objects of the invention, according to one embodiment, a first fastener portion, in a first position, is positioned within or substantially flush with the outer surface of a first flexible disk cartridge. This may be referred to as a non-projecting position. In a second position, at least part of the first fastener portion projects outwardly beyond the outer surface of the first flexible disk cartridge. This may be referred to as a projecting position. In the projecting position the first fastener portion is capable of interlocking, engaging, or otherwise cooperating with a second fastener portion of a second flexible disk cartridge to fasten the two flexible disk cartridges together. The first fastener portion normally may be in the first position and be movable to the second position either manually or automatically when desired. Alternatively, the first fastener portion normally may be in the second position and movable to the first position either manually or automatically when desired. For example, the first fastener portion may be movable by inversion of the flexible disk cartridge. Preferably, the first fastener portion comprises a male portion and the second fastener portion comprises a complementary-shaped, female portion for receiving and engaging the male portion to fasten the flexible disk cartridges together. Preferably two or more flexible disk cartridges are each provided with a male and female portion as described above. If desired, the fastening together of two flexible disk cartridges can cause the first fastener portion of the second flexible disk cartridge to assume a projecting position to enable additional flexible disk cartridges to be fastened together without additional movement of the first fastener portion relative to the second flexible disk cartridge. Once at least two flexible disk cartridges are fastened together, subsequent flexible disk cartridges can be joined without the need to invert the flexible disk cartridges. The fastener design permits the flexible disk cartridges to be separated easily when desired.

One or more fastener portions can be located within the flexible disk cartridge. They can be located anywhere within the flexible disk cartridge where they will not interfere with the magnetic media, the shutter, the write-protect tab, the disk size indicator, or other features integral to the proper or normal functioning of the flexible disk cartridge. Their location is not necessarily directly dependent upon the disk drive mechanism. However, corresponding first and second portions should be correspondingly located to enable engagement of the first portion of one cartridge with the second portion of a second cartridge, preferably to enable the cartridges to be stacked neatly.

Preferably, the flexible disk cartridges lock together tightly to withstand jarring and minor impact without separation. The fasteners should be durable, should not easily break off, and should not wear or deteriorate excessively through use or over time. Preferably, the user should be able to lock the flexible disk cartridges together repeatedly and pull them apart with minimal instruction, limited manual dexterity and strength, and in a simple operation.

It is also preferred that the flexible disk cartridges incorporating a fastening system according to the present invention should function properly with a wide variety of disk drives. The incorporation of a fastener into flexible disk cartridges should allow insertion and removal of the flexible disk cartridges into and from a disk drive without jamming, sticking, or rubbing and, to the maximum extent possible, enable the flexible disk cartridge to conform to all relevant industry specifications.

Various structural arrangements to accomplish these and other objects and goals are within the scope of the invention. By way of example, according to one embodiment, a flexible disk cartridge is provided with a male portion that is movable, within predetermined limits, in a cavity formed in its housing. In this embodiment, the male portion is normally in a non-projecting position when the flexible disk cartridge is oriented top side up. However, when the flexible disk cartridge is inverted, at least part of the male portion of the fastener drops downwardly from the cavity into a projecting position. From this projecting position, the male portion can engage a complementary-shaped, female portion of a second, similar flexible disk cartridge by, for example, causing relative movement between the first and second flexible disk cartridges to cause the female portion to slide over, move laterally towards, or otherwise engage the male portion.

According to another embodiment, the male portion may be biased outwardly from the flexible disk cartridge housing by a spring or other biasing mechanism so that it is normally in a projecting position to enable the flexible disk cartridge to be fastened to another flexible disk cartridge. During insertion of the flexible disk cartridge into a disk drive, the biasing force on the male portion is overcome by contact with the walls or opening of the disk drive to cause the male portion to assume a non-projecting position and not interfere with insertion or ejection of the cartridge into or from the disk drive or the normal operation or use of the flexible disk cartridge. Preferably, one or more ends of the male portion are beveled or otherwise configured so that lateral contact with an obstruction results in a desired movement of the portion.

In another embodiment, at least one of the male and female portions are pivotable with respect to the flexible disk cartridge housing to enable pivotal movement from a projecting position to a non-projecting position or vice versa. For example, the male or female portion may be provided with two cylindrical pivot flares or other pivot mechanisms that are positioned on opposite sides of the portion and eccentrically to one side of the portion's center of gravity. The flares, for example, loosely attach the portion to the interior of the flexible disk cartridge. The cartridge housing preferably limits the portion's movement to one, approximately 90°, arc. When the flexible disk cartridge is inverted, the weightier side of the portion drops downwardly into a projecting position enabling fastening to another, similar flexible disk cartridge.

These and other objects of the invention, as well as the advantages thereof, will become more readily apparent when reference is made to the following description taken in conjunction with the accompanying drawings.

DETAILED DESCRIPTION OF THE PREFERRED EMBODIMENTS

Figure 1:
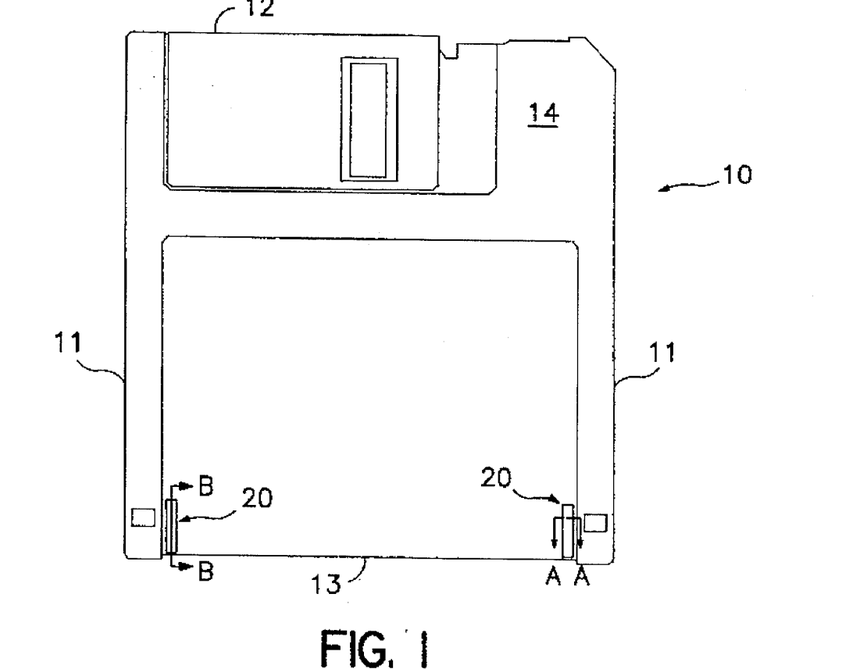
FIG. 1 is a top plan view of a flexible disk cartridge incorporating a fastener according to one embodiment of the present invention.
Figure 1A:
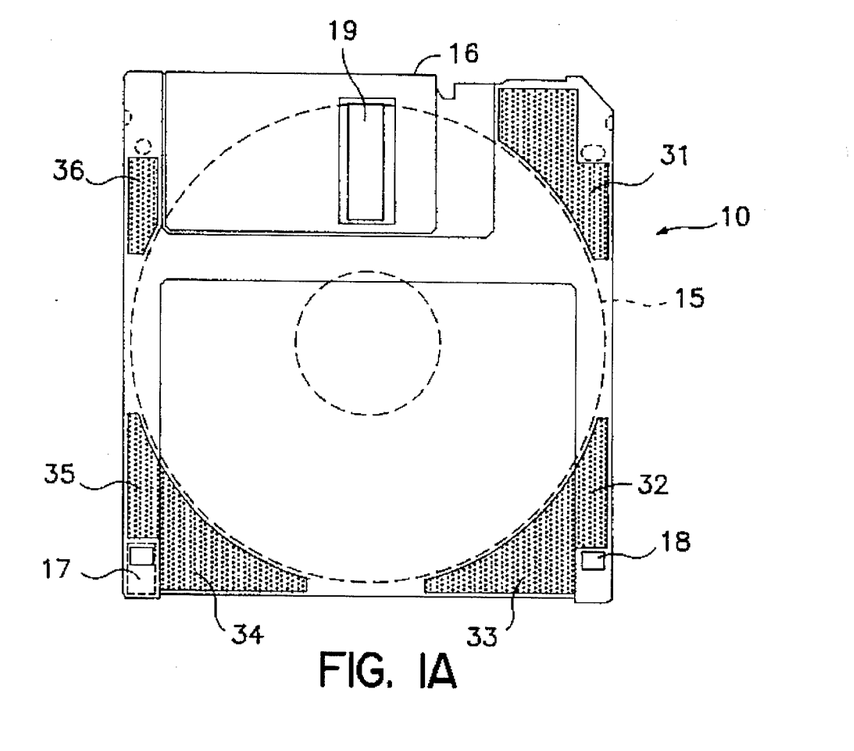
FIG. 1A is a top plan view of a flexible disk cartridge illustrating possible areas for locating a fastener according to the present invention.

With reference to the drawings in general, and to FIGS. 1 and 1A in particular, what is generally well known in the art as a 3.5 inch flexible disk cartridge is generally designated as 10. Flexible disk cartridge 10 has sides 11, front edge 12, rear edge 13, top surface 14, and a bottom surface (not shown in FIG. 1). Other standard features of the flexible disk cartridge 10 are shown including magnetic media 15, shutter 16, write-protect hole 17, size indicator 18, and read-write window 19. The dashed lines in FIG. 1A represent locations of some hidden features that could prevent placement of a fastener. Other features of such flexible disk cartridges are well known and will not be described here.

According to one embodiment of the present invention, flexible disk cartridge 10 is provided with fastener portions generally indicated as 20. As shown, the fasteners are located near the rear edge 13 and extend partially towards front edge 12. Other orientations are possible. The fasteners can be positioned in one or more of shaded areas 31, 32, 33, 34, 35, and 36 as shown in FIG. 1A to allow movement of the fastener without interfering with the working features or normal operation of the flexible disk cartridge. However, while these are the preferred locations, the invention is not so limited. Other locations may be suitable. Additionally, the fastening portions may be located within or on, or extend from the top, bottom, or both top and bottom surfaces of, the flexible disk cartridge 10.

Figure 2:
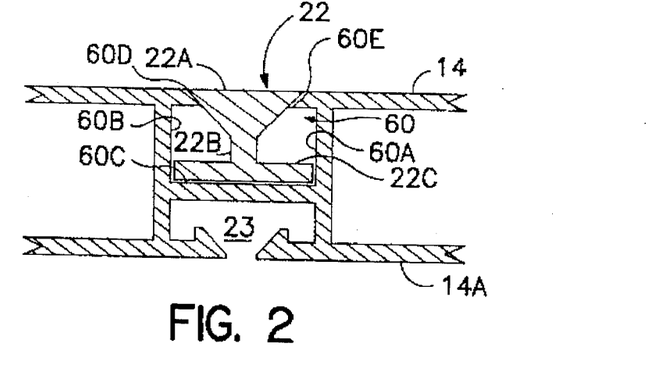
FIG. 2 is a partial cross-sectional view taken along line A—A of FIG. 1 according to one embodiment of the invention.
Figure 3:
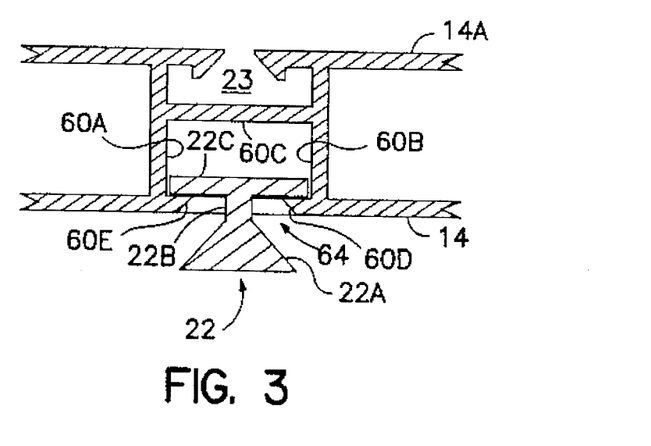
FIG. 3 illustrates the embodiment of FIG. 2 inverted.
Figure 4:
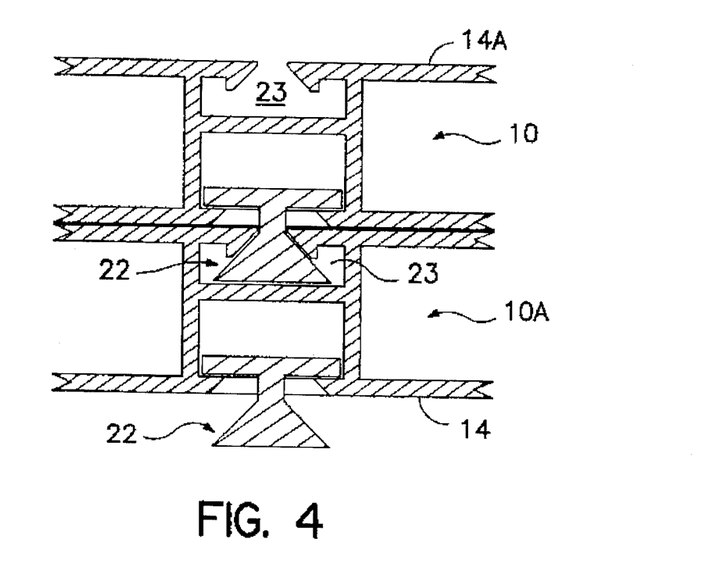
FIG. 4 illustrates the flexible disk cartridge of FIG. 3 fastened to a second, similar flexible disk cartridge.

FIG. 2 is a cross-sectional view taken along line A—A of FIG. 1 according to one embodiment of the invention. FIG. 2 illustrates a first fastener portion 22 on one side of the flexible disk cartridge and a second fastener portion 23 on an opposite side. For example, the first fastener portion may be located near the top surface of flexible disk cartridge 10 and the second portion 23 may be located near the bottom surface 14A, or vice versa. The first fastener portion 22 is shown in FIG. 2 in a non-projection position. FIG. 3 illustrates the embodiment of FIG. 2 inverted to cause the first fastener portion 22 to be in a projecting position. FIG. 4 illustrates the first fastener portion 22 of FIG. 3 fastened to a second fastener portion 23 of a second flexible disk cartridge 10A.

More specifically, according to this embodiment, each flexible disk cartridge 10 is provided with a fastener system comprising a first fastener portion 22 and a complementary-shaped, second fastener portion 23. As used herein "complementary-shaped" refers to shapes that are complementary to one another. Preferably, the first fastener portion is a male portion and the second fastener portion is a female portion and at least one of the first and second fastener portions is movable relative to flexible disk cartridge 10. The first fastener portion may be made up of several portions, preferably including head portion 22A, stem 22B, and base portion 22C. Head portion 22A is integral or unitary with stem 22B which is integral or unitary with base portion 22C. Preferably, the first and second fastener portions comprise a mortise and tenon configuration and will be described as such. However, the invention is not so limited. Various other geometries, configurations, and orientations are possible and within the scope of the invention.

As shown, the first fastener portion 22 is located within a cavity or recessed area generally indicated as 60. The cavity is defined by a plurality of walls including side walls 60A and 60B and bottom wall 60C. The cavity has an open end having an opening generally indicated as 64. The width of the cavity 60 is equal to the distance between side walls 60A and 60B. It is also equal to the width of bottom wall 60C. As shown in FIGS. 2–4, for example, the opening 64 at the open end may be defined by wall portions 60D and 60E. Preferably, the wall portions 60D and 60E have a tapered surface corresponding to the taper of the outer geometry of head portion 22A. Other geometries and configurations are also possible to enable the outer surface of first fastener portion 22 to lie substantially flush with the top surface 14 as shown in FIG. 2. Preferably, the width of base portion 22C of the first fastener portion is slightly less than the width of the cavity 60 and the opening 64 is smaller than the width of base portion 22C to limit the ability of first fastener portion 22 to move away from bottom wall 60C and to contain at least a portion of the first fastener portion 22 within cavity 60. Preferably, the overall height of the first fastener portion 22 is substantially equal to the height of cavity 60 so that the top surface of head portion 22A is substantially flush (i.e., slightly below, level with, or slightly above) with the top surface 14.

In the configuration shown in FIG. 2, base portion 22C normally abuts against bottom wall 60C. When flexible disk cartridge 10 is inverted as shown in FIGS. 3 and 4, however, at least the head portion 22A of the first fastener portion 22 falls downwardly due to gravity to the position shown, and projects from the cavity 60 until the base portion 22C engages the wall portions 60D and 60E of the opening 64. In this position, at least a portion of the first fastener portion 22 is in a projecting position and can engage with a second fastener portion 23 of second flexible disk cartridge 10A, having a mortise-shaped recess complementary to at least a portion of the tenon-shaped head portion 22A.

By aligning the first fastener portion of flexible disk cartridge 10 with the second fastener portion of flexible disk cartridge 10A and causing relative movement between flexible disk cartridges 10 and 10A, for example, by sliding the top surface 14 of flexible disk cartridge 10 over the bottom surface 14A of flexible disk cartridge 10A, the head portion 22A of flexible disk cartridge 10 engages the complementary-shaped, recessed area 23 of flexible disk cartridge 10A and fastens or interlocks the two flexible disk cartridges together.

Figure 5:
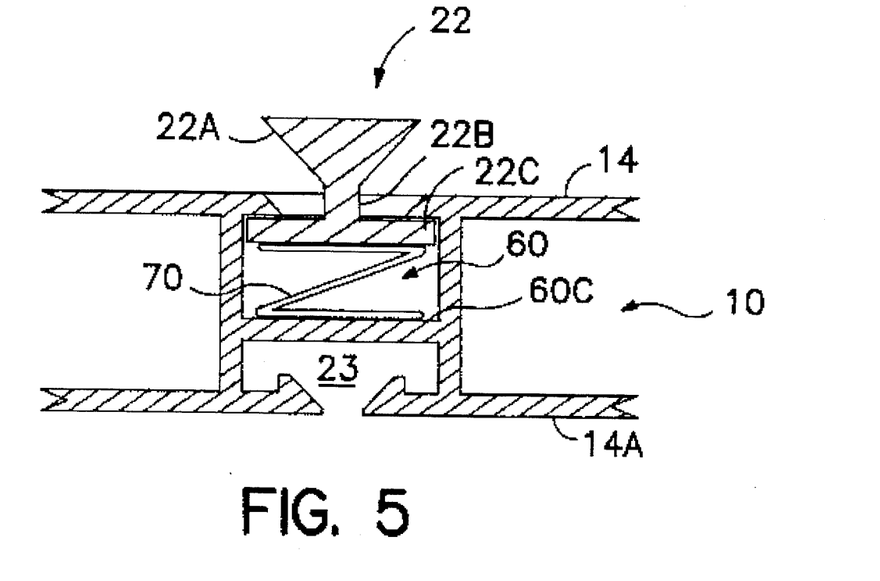
FIGS. 5 and 6 are partial cross-sectional illustrations of a fastener according to another embodiment of the invention.
Figure 6:
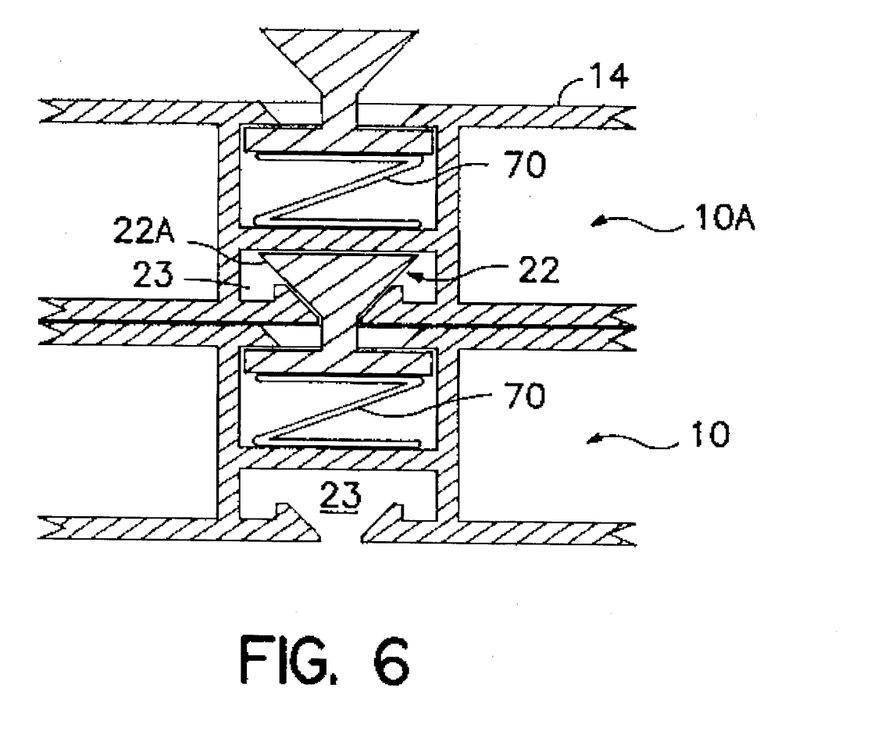

While the embodiment shown illustrates a particular gravity-actuated mortise and tenon type fastener having a particular shape and configuration in a normally non-projecting position, the invention is not so limited. For example, the first fastener portion normally may be in a projecting position. An example of this is shown in FIGS. 5 and 6. In FIGS. 5 and 6 and other figures, the same reference numerals used in FIGS. 2–4 are used to designate like elements. For clarity, some reference numbers have been omitted in various figures.

According to the embodiment of FIGS. 5 and 6, first fastener portion 22 is biased to be in a normally projecting position. As shown, first fastener portion 22 projects away from bottom wall 60C due to a biasing force, for example, the bias of a leaf spring 70 or other biasing mechanism. For example, the biasing mechanism may be located within cavity 60 between base portion 22C and bottom wall 60C. The biasing force causes at least head portion 22A to be biased outwardly from cavity 60 until base portion 22C engages wall portions 60D and 60E. The force of the biasing mechanism 70 is sufficiently weak so that upon insertion or ejection of the cartridge into or from a disk drive mechanism, contact between the head portion 22A and the disk drive mechanism forces the head portion 22A at least partially into cavity 60, preferably positioning its top surface substantially flush with the top surface 14. When another flexible disk cartridge 10A having a mortise-shaped recess 23 is aligned with the head portion 22A of the first fastener portion 22 and flexible disk cartridges 10 and 10A are moved relative to one another, the head portion 22A engages portion 23 and fastens flexible disk cartridges 10 and 10A together.

Figure 7:
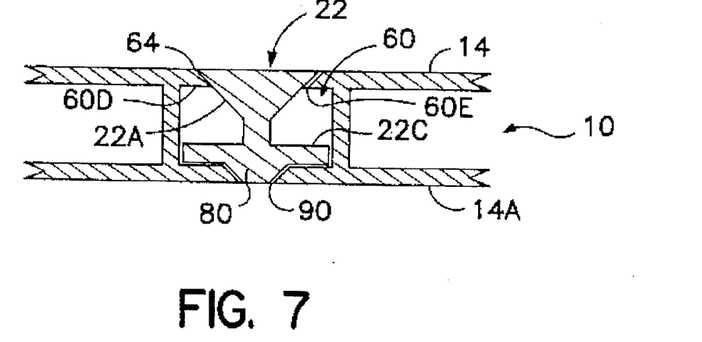
FIGS. 7, 8, and 9 are partial cross-sectional views of another embodiment of the present invention.
Figure 8:
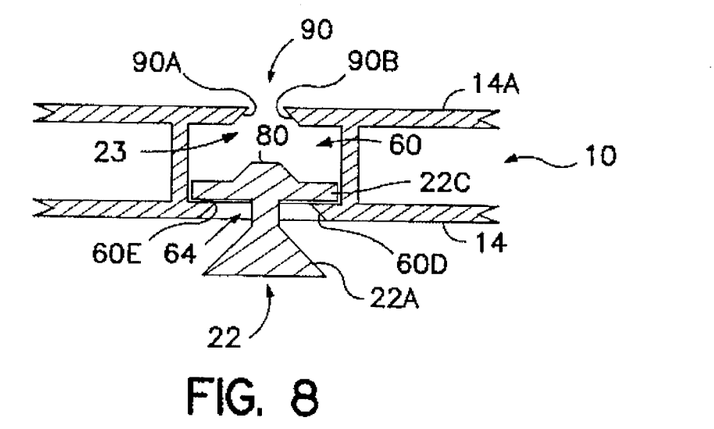
Figure 9:
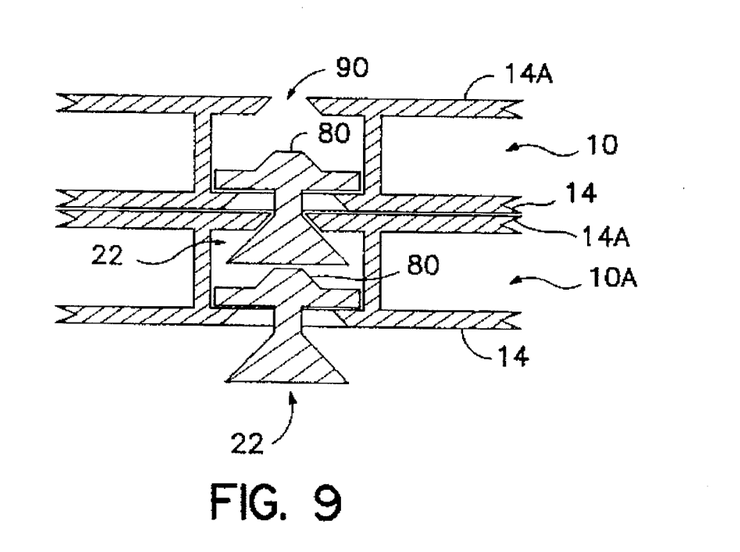

According to another embodiment, reference is made to FIGS. 7 through 9, which are partial cross-sectional views that illustrate a top surface 14 and a bottom surface 14A of flexible disk cartridge 10. The top and bottom surfaces 14 and 14A are secured to each other in a known manner. In an area suitable for positioning a fastener as explained with reference to FIG. 1A, first fastener portion 22 is positioned in cavity 60. This embodiment is similar to the foregoing embodiments. However, in this embodiment, first fastener portion 22 further includes a spacing projection 80 integral or unitary with base portion 22C. Additionally, cavity 60 extends from opening 64 through the bottom surface 14A of flexible disk cartridge 10 to form a second opening 90, defined by portions 90A and 90B. Preferably, the portions 90A and 90B have a tapered surface corresponding to the taper of the outer geometry of head portion 22A. As shown in FIG. 7, first fastener portion 22 normally is in a non-projecting position. In this embodiment, second fastener portion 23 of flexible disk cartridge 10 is actually formed by a portion of cavity 60 and second opening 90, when flexible disk cartridge 10 is inverted as shown in FIG. 8, causing first fastener portion 22 to assume a projecting position. As with the earlier described embodiments, base portion 22C limits the movement of first fastener portion 22 when it abuts against wall portions 60D and 60E. Upon inversion, opening 90 opens upwardly for receipt of a complementary, tenon-shaped head portion of another first fastener portion from another flexible disk cartridge.

As shown in FIG. 9, two separate flexible disk cartridges 10 and 10A are interconnected by a mortise and tenon type fastener according to the embodiment of FIGS. 7–8. The spacing projection 80 serves to provide surface 14A of the flexible disk cartridge 10 with an uninterrupted surface when the fastener is in a non-projecting position.

Figure 9A:
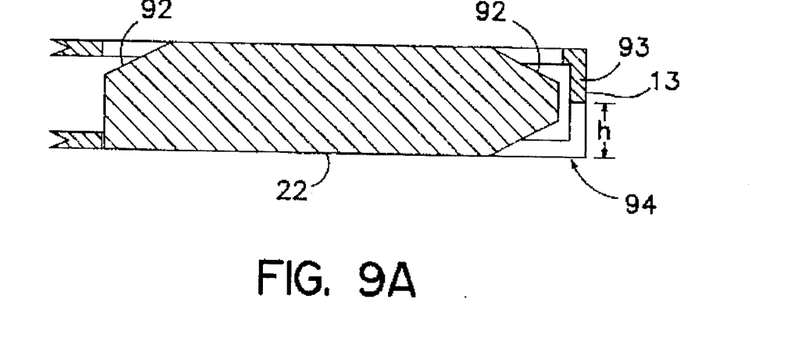
FIG. 9A is a partial cross-sectional view taken along line B—B of FIG. 1 of one aspect of the present invention.

Examples of various beveled surfaces are shown in FIG. 9A. As shown, both ends of an upper portion 92 of first fastener portion 22 are beveled to effect the desired movement of first fastener portion 22 upon lateral contact with an obstruction such as the walls or opening of a disk drive mechanism. Also shown, the bottom surface of first fastener portion 22 nearest rear edge 13 of flexible disk cartridge 10 is beveled to provide a ramped surface against which the first fastener portion of another flexible disk cartridge fastener can contact and cause first fastener portion 22 to which it is associated to assume a projecting position. Thus, after two flexible disk cartridges 10 and 10A are connected, subsequent flexible disk cartridges can be attached without inverting flexible disk cartridges or otherwise manipulating first fastener portion 22. Beveled surface features may be used with the various embodiments disclosed herein. The degree of beveling may be varied and additional beveling may be provided to facilitate the efficient assembly and use of flexible disk cartridges. As shown in FIG. 9A, at rear edge 13, the upper portion of cavity 60 may be closed by the housing as indicated at 93. A bottom portion 94 of cavity 60 at rear edge 13 may be open to receive a first fastener portion 22 of a second flexible disk cartridge 10A. The height h of bottom portion 94 is preferably selected to accommodate the height of head portion 22A of first fastener portion 22.

FIGS. 10, 11, 12, and 12A illustrate another embodiment of the present invention. This embodiment includes a pivotable fastener, for example, a pivotable fastener having a male and a female portion. As one example, the fastener may comprise a mortise and tenon fastener. However, other geometries and configurations consistent with this concept can be used.

Figure 10:
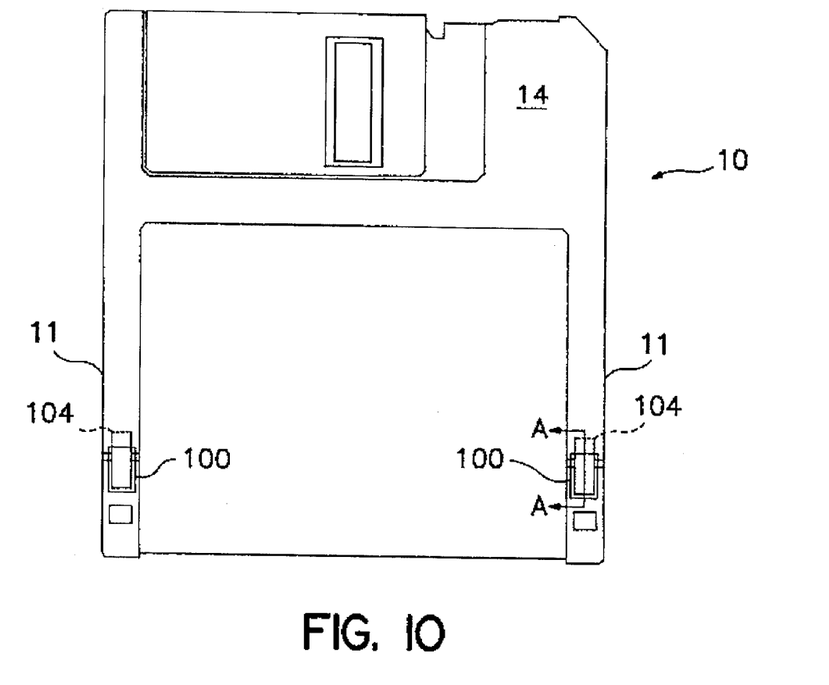
FIG. 10 is a top plan view of a flexible disk cartridge with a fastener according to another embodiment of the invention.
Figure 12:
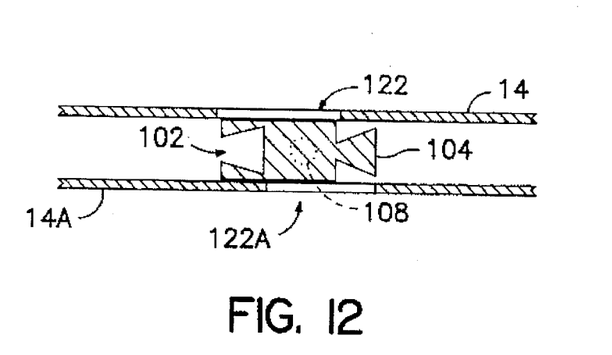
FIGS. 12 and 12A are partial cross-sectional views taken along line A—A of FIG. 10.
Figure 12A:
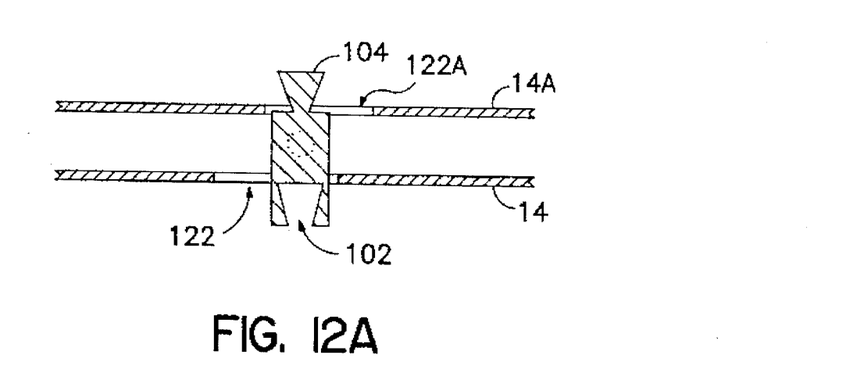

FIG. 10 illustrates a top plan view of a flexible disk cartridge 10 including a top surface 14 and a bottom surface 14A (FIGS. 12 and 12A). Pivotally mounted between these surfaces are fasteners 100 located adjacent to side edges 11 of flexible disk cartridge 10. Fasteners 100 are preferably positioned in a shaded area described in FIG. 1A to allow movement of the fastener without interfering with the working features or normal operation of flexible disk cartridge 10. Preferably, they are mountable to a wall or other support surface extending from or between top surface 14 and bottom surface 14A. Other mounting positions may be desired.

In the embodiment shown, fastener 100 (FIG. 11) includes a body 101 comprising a female or mortise portion 102 and a male or tenon portion 104. Two cylindrical pivot flares 108 are attached to, or formed from, body 101 and are located on opposite sides of the body 101. Preferably, the pivot flares are mounted closer to portion 104 than portion 102 to enable an eccentric pivoting of fastener 100. Alternatively, fastener 100 may be spring biased or different weight distributions for portions 102 and 104 may be used to induce a pivoting motion.

Figure 11:
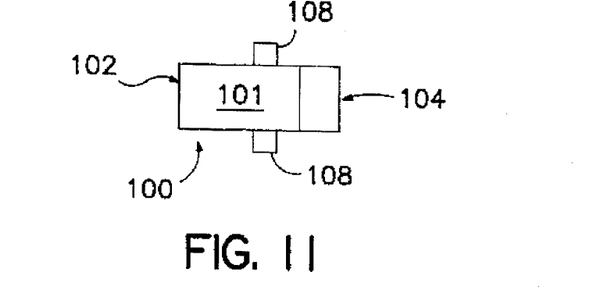
FIG. 11 is a top view of a combined first and second fastener portion according to the embodiment of FIG. 10.

FIGS. 12 and 12A illustrate a partial cross-sectional view of a flexible disk cartridge 10 incorporating the fastener of FIG. 11. In FIG. 12, fastener 100, including first and second fastener portions 102 and 104, is in a non-projecting position. FIG. 12A shows flexible disk cartridge 10 when it is inverted and the fastener is in a projecting position.

In FIG. 12, a portion of the top surface 14 of flexible disk cartridge 10 extends above portion 104 and a portion of the bottom surface 14A extends below portion 102. This prevents the fastener from pivoting counter-clockwise (as oriented in FIG. 12). However, top surface 14 and bottom surface 14A are provided with cut-out areas 122 and 122A, respectively, as shown in FIGS. 12 and 12A. Cut-out areas 122 and 122A are sized and positioned with respect to fastener 100 to enable movement therethrough of the portions 102 and 104, respectively, when the flexible disk cartridge is inverted as shown in FIG. 12A. When flexible disk cartridge 10 is inverted, fastener 100 pivots preferably through approximately a 90° arc about pivot flares 108. The heavier weight of portion 102 causes body 101 to pivot counter-clockwise (as oriented in FIG. 12A) about pivot flares 108, causing portions 102 and 104 to assume a projecting position as shown in FIG. 12A. Portions 102 and 104 are then available for engagement with complementary-shaped portions of a similar flexible disk cartridge which has similarly been inverted.

Another pivotal fastener embodiment is depicted in FIGS. 13, 14, 15, 15A, and 15B. This embodiment is similar to the previous embodiment in that the fastener pivots. However, instead of a mortise and tenon fastener as depicted in FIGS. 10–12A, an interference fit or friction coupling is used.

Figure 13:
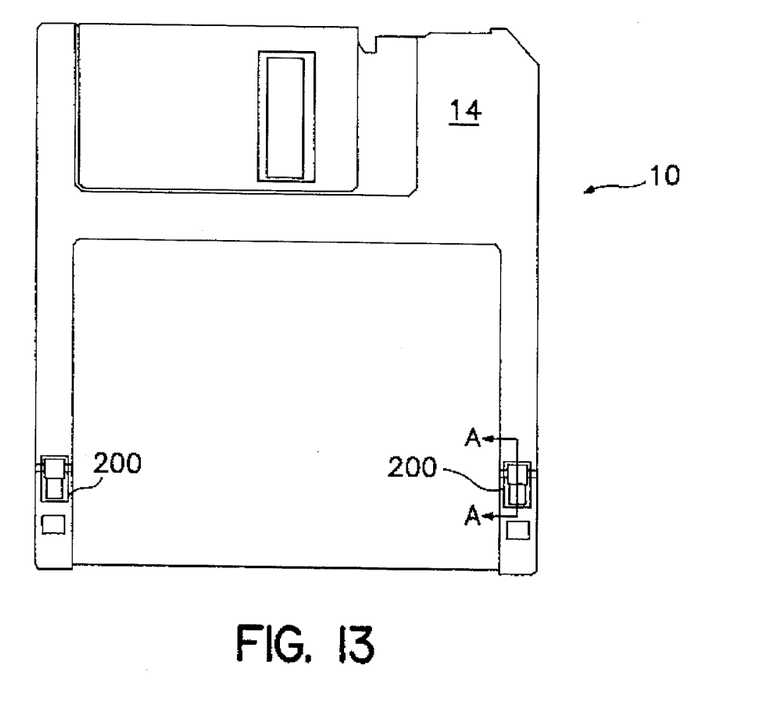
FIGS. 13, 14, 15; and 15A are similar views in the same positions as those shown in FIGS. 10, 11, 12, and 12A, respectively, for another embodiment of the present invention.
Figure 15:
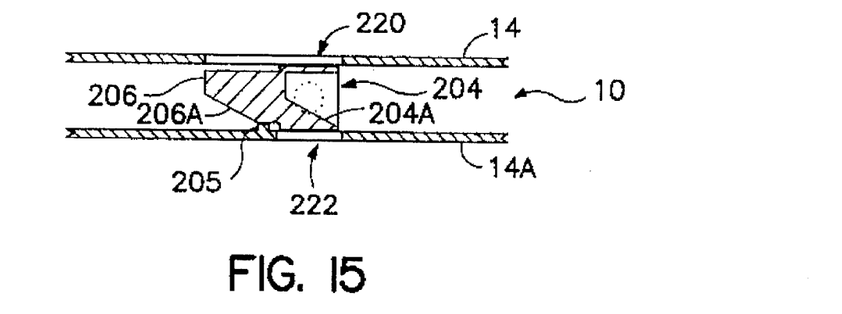
Figure 15A:
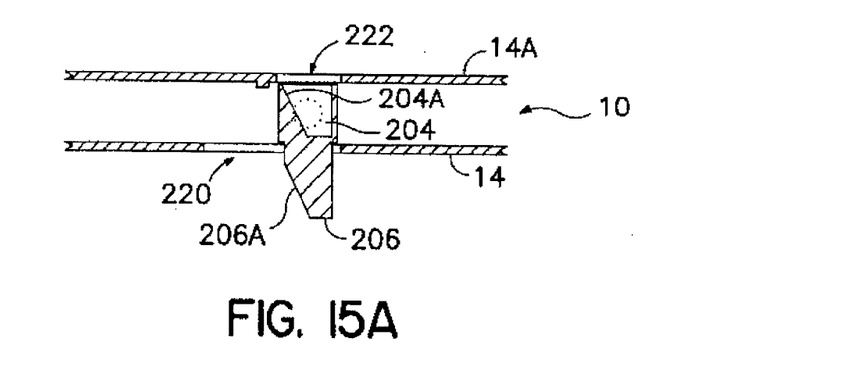

FIG. 13 illustrates a top plan view of a flexible disk cartridge 10 incorporating a fastener 200 according to this embodiment. Flexible disk cartridge 10 includes a top surface 14 and a bottom surface 14A (FIGS. 15 and 15A). Pivotally mounted between these surfaces are fasteners 200 located adjacent to side edges 11 of flexible disk cartridge 10. Fasteners 200 are preferably positioned in a shaded area described in FIG. 1A to allow movement of the fastener without interfering with the working features or normal operation of the flexible disk cartridge. Preferably, they are mountable to a wall or other support surface extending from or between top surface 14 and bottom surface 14A. Other mounting positions may be desired.

In the embodiment shown, fastener 200 (FIG. 14) includes a body 202 including a first fastener portion or male portion 206 and a second fastener portion or female portion 204. Portion 204 includes an opening 208. Two cylindrical pivot flares 210 are attached to, or formed from, body 202 and are located on opposite sides of body 202. Preferably, the pivot flares are mounted closer to portion 204 than to portion 206 to enable an eccentric pivoting of fastener 200. Alternatively, fastener 200 may be spring biased or different weight distributions for portions 204 and 206 may be used to induce a pivoting of the fastener.

Figure 14:
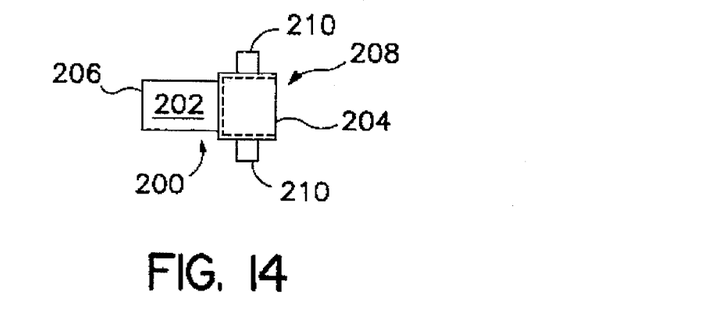

FIGS. 15 and 15A illustrate a partial cross-sectional view of a flexible disk cartridge 10 incorporating fastener 200 of FIG. 14. In FIG. 15, fastener 200, including first and second fastener portions 204 and 206, is in a non-projecting position. FIG. 15A shows flexible disk cartridge 10 when it is inverted and the fastener is in a projecting position. In FIG. 15, a portion of the bottom surface 14A extends below portion 206. This prevents the fastener from pivoting counter-clockwise (as oriented in FIG. 15). However, top surface 14 and bottom surface 14A are provided with cut-out areas 220 and 222, respectively, as shown in FIGS. 15 and 15A. Cut-out area 220 is sized and positioned with respect to fastener 200 to enable pivoting therethrough of portion 206 when flexible disk cartridge 10 is inverted as shown in FIG. 15A. Cut-out area 222 allows pivoting therethrough of female portion 204 upon inversion of flexible disk cartridge 10. However, it is not necessary for the female portion to project through the cut-out area 222. It may be positioned with respect to the cut-out area 222 to receive a male portion therethrough. Alternatively, the female portion may project through cut-out area 222 and the male portion may be positioned with respect to cut-out area 220 to receive a female portion therethrough.

In the embodiment shown, when flexible disk cartridge 10 is inverted, the heavier weight of the portion 206 causes the body 202 to pivot counter-clockwise (as oriented in FIG. 15A) about the pivot flares 210, causing the portion 206 to assume a projecting position and portion 204 to be positioned with respect to the cut-out area 222 for engagement with a complementary-shaped portion of a similar flexible disk cartridge. When flexible disk cartridge 10 is inverted, the fastener 200 pivots, preferably through approximately a 90° arc about the pivot flares 210. Upon movement of a similarly-oriented flexible disk cartridge toward flexible disk cartridge 10, an interference fit or friction coupling between the male portion 206 of fastener 200 and a complementary-shaped, female portion of another fastener of another flexible disk cartridge can be obtained or a connection between the female portion 204 of the fastener 200 and a complementary-shaped, male portion of another fastener of another flexible disk cartridge can be obtained.

Figure 15B:
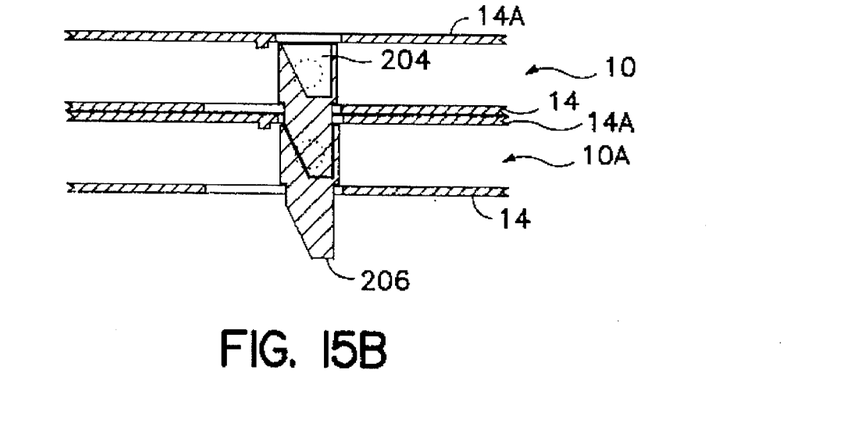
FIG. 15B illustrates a partial cross-sectional view of two cartridges fastened together according to this embodiment.

Various interference fit or friction fit techniques, per se, are known and can be used. Thus, by moving the flexible disk cartridges toward each other in a substantially perpendicular direction to the plane of the top surface 14, the fasteners can be snapped together or otherwise engaged to fasten the flexible disk cartridges as shown in FIG. 15B.

Additionally, the male portion 206 and the female portion 204 may be provided with angled surfaces 206A and 204A, respectively. The angled surface 206A of the male portion 206 and the angled surfaces 204A of the female portion 204 allow fasteners to resist pivoting back to a recessed position when flexible disk cartridges are being joined. Also, the surfaces of the male and female portions frictionally engage each other and assist in interlocking the flexible disk cartridges. If desired, the bottom surface 14A may be provided with an auxiliary support surface 205 that is integral or unitary with bottom surface 14A. The support surface 205 assists in preventing rotation of the fastener 200 and supports the fastener in its non-projecting position.

Figure 16:
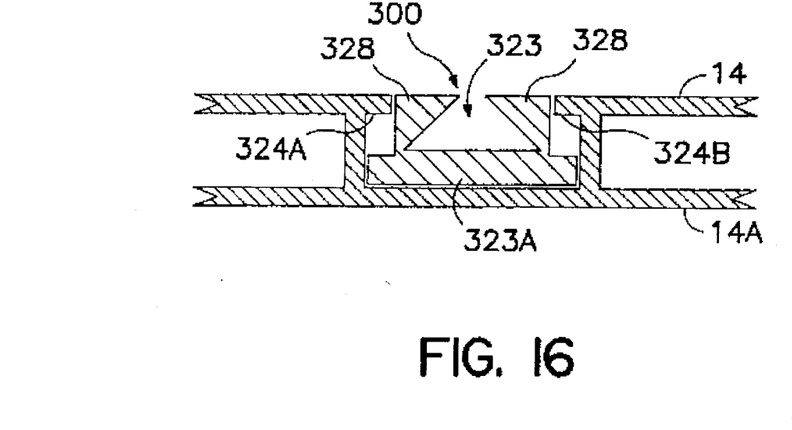
FIGS. 16–16A and 17–17A illustrate partial cross-sectional views according to other alternative embodiments.
Figure 16A:
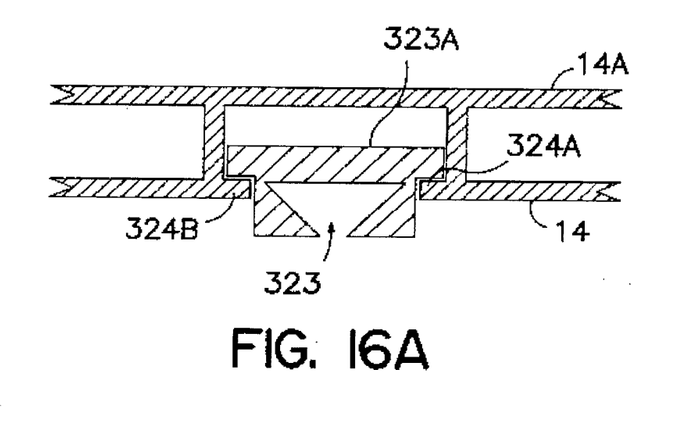

FIGS. 16 and 16A illustrate another embodiment having a fastener 300 comprising a female portion 323 similar to that described in connection with the embodiment of FIGS. 2–4. However, the female portion 323 is shown to be movable from a substantially non-projecting position (FIG. 16) to a projecting position (FIG. 16A) by inversion or biasing, for example. A base portion 323A is provided to limit movement of the female portion 323, preferably by engagement with projections 324A and 324B which define opening 325 in the top surface 14. Preferably, base portion 323A is integral or unitary with portion 328 and portion 328 has an opening formed therein to define female portion 323.

Figure 17:
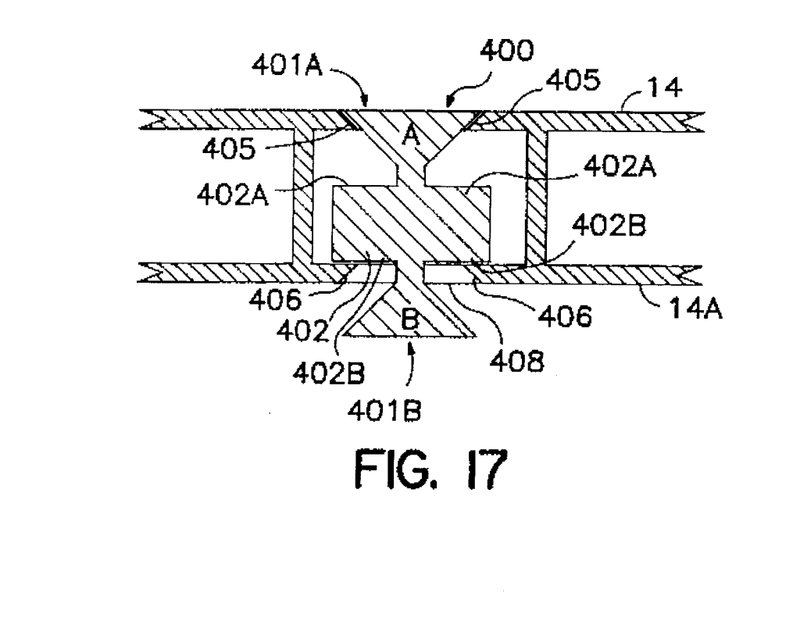
Figure 17A:
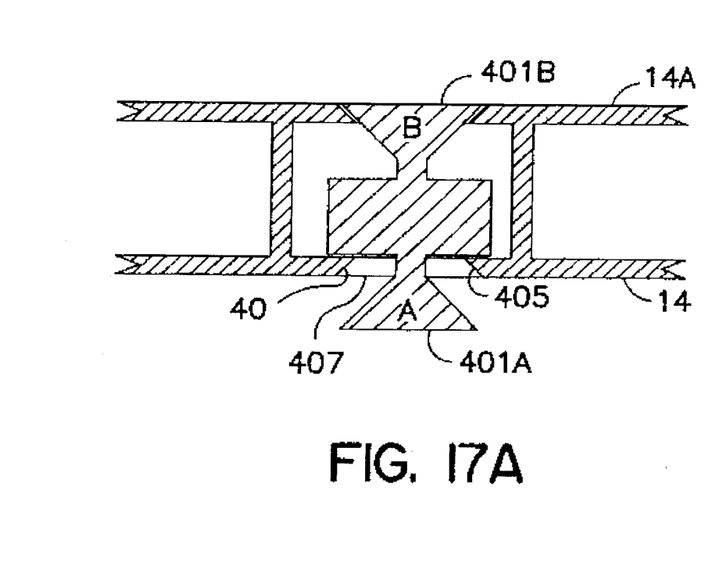

In FIGS. 17 and 17A, the fastener 400 is shown to comprise two male portions 401A, 401B integral or unitary with one another to enable fastening to another object without the need for inversion, although inversion may be used. Also shown is an intermediate portion 402, which, if used, may be integral or unitary with and between the two male portions to limit movement of the fastener. As shown, intermediate portion 402 may be substantially rectangular having opposed substantially parallel surfaces including 402A and 402B which can engage with projections 405 and 406 which respectively define openings 407 and 408 in top surface 14 and bottom surface 14A to limit the movement of fastener portions 401A, 401B.

Although various fasteners have been shown in conjunction with a flexible disk cartridge, it is intended, consistent with the scope of the present invention, that other objects can be connected by the fasteners illustrated and described herein. In particular, but without limitation, the various embodiments of the present invention are suitable for use in fastening objects where permanently projecting fasteners or fastener portions might interfere with the normal or desired operation or use of the object or might otherwise be undesirable. Examples of other such objects include other forms of rigidly packed magnetic, optical, and magneto-optical media including video, audio, and data cassettes and cartridges. Other examples include, but are not limited to, storage trays, cases, boxes, and units and other objects where it is desirable that the outer surfaces permit unobstructed flow or movement of solids, fluids, or gases. While the invention is particularly useful for fastening like objects, it is not so limited.

The fasteners and fastener portions described herein can be formed of any suitable material including lightweight, durable plastic. Various geometries, configurations, and orientations for the fasteners and fastener portions can be used in addition to those shown and described. The fasteners and fastener portions can be attached to or formed from the housing or other portions of the flexible disk cartridge or other objects. In some cases a flexible disk cartridge or other object may have just one of a male or female portion. In other cases it may have a plurality of either male portions, female portions, or both male and female portions, at various suitable locations and the portions may be of different sizes, orientations, geometries and/or configurations to permit flexibility in fastening to other similar objects or dissimilar objects. For example, an increase in the height of a fastener portion may permit flexible disk cartridges or other objects to be fastened with a predetermined space therebetween. Alternatively, or in addition, one or more of the first or second fastener portions may be deliberately offset with respect to the other of the first or second fastener portion to permit flexible disk cartridges or other objects to be fastened without being directly aligned on top of one another. This may permit identifying data or other indicia on the cartridge or other object to be visible even when a plurality of cartridges or objects are fastened together to easily identify or select a particular cartridge or object.

Having described the preferred embodiments of the invention, many modifications thereto will become apparent to those skilled in the art to which it pertains without deviation from the spirit of the invention as defined by the scope of the appended claims.

I claim:

1. A flexible disk cartridge comprising:

a housing; and fastening means, operatively connected to said housing, for fastening said flexible disk cartridge to a second flexible disk cartridge;

wherein said fastening means comprises a first portion, at least part of which is movable between a first position and a second position to project from said housing and to enable fastening of said cartridges, and wherein said fastening means remains operatively connected to said housing during insertion of said flexible disk cartridge into a disk drive mechanism, without preventing said insertion.

2. The flexible disk cartridge according to claim 1, wherein said housing has an outer surface and, in one of said first and second positions, a surface of said first portion is located substantially flush with said outer surface.

3. The flexible disk cartridge according to claim 1, wherein at least part of said first portion is movable from said first position to said second position due to gravity.

4. The flexible disk cartridge according to claim 1, wherein at least part of said first portion is movable from said first position to said second position by inversion of said flexible disk cartridge.

5. The flexible disk cartridge according to claim 1, wherein at least part of said fastening means is movable from said first position to said second position by pivotal movement.

6. The flexible disk cartridge according to claim 1, wherein movement of said first portion is limited by a portion of said housing.

7. The flexible disk cartridge according to claim 6, wherein said portion of said housing comprises at least one projection and said first portion comprises a base portion operatively positioned to engage said at least one projection to limit movement of said first portion.

8. The flexible disk cartridge according to claim 1, further comprising a biasing member operatively positioned with respect to said first portion to normally bias said first portion outwardly from said housing.

9. The flexible disk cartridge according to claim 8, wherein biased movement of said first portion is limited by a portion of said housing.

10. The flexible disk cartridge according to claim 9, wherein said portion of said housing comprises at least one projection and said first portion comprises a base portion operatively positioned to engage said at least one projection to limit movement of said first portion.

11. The flexible disk cartridge according to claim 1, wherein said first portion is pivotally attached to said housing.

12. The flexible disk cartridge according to claim 11, wherein pivotal movement of said first portion is limited by a portion of said housing.

13. The flexible disk cartridge according to claim 1, wherein said fastening means further comprises a second portion, at least a part of which has a shape complementary to at least a part of said first portion.

14. The flexible disk cartridge according to claim 1, wherein said fastening means comprises a male portion and a complementary-shaped, female portion.

15. The flexible disk cartridge according to claim 14, wherein at least part of one of said male portion and female portion is movable from a first position to a second position.

16. The flexible disk cartridge according to claim 1, wherein said fastening means is located where it does not interfere with normal operation of said flexible disk cartridge.

17. The flexible disk cartridge according to claim 1, wherein said second flexible disk cartridge comprises fastening means substantially identical to said fastening means of said flexible disk cartridge.

18. The flexible disk cartridge according to claim 1, wherein said first portion comprises at least one surface that is beveled.

19. The flexible disk cartridge according to claim 1, wherein said first portion comprises a spacing projection.

20. The flexible disk cartridge according to claim 1, wherein said first portion comprises a tenon configuration.

21. The flexible disk cartridge according to claim 1, wherein said first portion comprises a tenon configuration and further comprising a second fastener portion comprising a mortise configuration.

22. The flexible disk cartridge according to claim 1, wherein said flexible disk cartridge is fastened to said second flexible disk cartridge by relative sliding movement between said flexible disk cartridge and said second flexible disk cartridge.

23. The flexible disk cartridge according to claim 1, wherein said flexible disk cartridge is fastened to said second flexible disk cartridge by interference or friction fit coupling.

24. A flexible disk cartridge fastening system for selectively fastening together at least two flexible disk cartridges, each of said flexible disk cartridges comprising:

a housing comprising a top surface and a bottom surface;

a first fastener portion movable between a first position and a second position to enable at least part of said first fastener portion to project outwardly from said housing through one of said top and bottom surfaces while in one of said first or second positions; and a second fastener portion associated with the other of said top or bottom surfaces and at least part of which is shaped complementary to at least part of said first fastener portion;

wherein at least part of a first fastener portion of a first flexible disk cartridge can engage at least part of a second fastener portion of a second flexible disk cartridge to fasten together said first and second flexible disk cartridges when said first fastener portion projects from said housing.

25. A media storage device comprising:

a housing; and fastening means, operatively connected to said housing, for fastening said media storage device to a second media storage device;

wherein said fastening means comprises a first portion, at least part of which is movable between a first position and a second position to project from said housing and to enable fastening of said cartridges, and wherein said fastening means remains operatively connected to said housing during insertion of said media storage device into a device for reading from or writing to said media storage device, without preventing said insertion.

26. The media storage device according to claim 25, wherein said housing has an outer surface and, in one of said first and second positions, a surface of said first portion is located substantially flush with said outer surface.

27. The media storage device according to claim 25, wherein at least part of said first portion is movable from said first position to said second position due to gravity.

28. The media storage device according to claim 25, wherein at least part of said first portion is movable from said first position to said second position by inversion of said media storage device.

29. The media storage device according to claim 25, wherein at least part of said fastening means is movable from said first position to said second position by pivotal movement.

30. The media storage device according to claim 25, wherein movement of said first portion is limited by a portion of said housing.

31. The media storage device according to claim 30, wherein said portion of said housing comprises at least one projection and said first portion comprises a base portion operatively positioned to engage said at least one projection to limit movement of said first portion.

32. The media storage device according to claim 25, further comprising a biasing member operatively positioned with respect to said first portion to normally bias said first portion outwardly from said housing.

33. The media storage device according to claim 32, wherein biased movement of said first portion is limited by a portion of said housing.

34. The media storage device according to claim 33, wherein said portion of said housing comprises at least one projection and said first portion comprises a base portion operatively positioned to engage said at least one projection to limit movement of said first portion.

35. The media storage device according to claim 25, wherein said first portion is pivotally attached to said housing.

36. The media storage device according to claim 35, wherein pivotal movement of said first portion is limited by a portion of said housing.

37. The media storage device according to claim 25, wherein said fastening means further comprises a second portion, at least a part of which has a shape complementary to at least a part of said first portion.

38. The media storage device according to claim 25, wherein said fastening means comprises a male portion and a complementary-shaped, female portion.

39. The media storage device according to claim 38, wherein at least part of one of said male portion and female portion is movable from a first position to a second position.

40. The media storage device according to claim 25, wherein said fastening means is located where it does not interfere with normal operation of said media storage device.

41. The media storage device according to claim 25, wherein said second media storage device comprises fastening means substantially identical to said fastening means of said media storage device.

42. The media storage device according to claim 25, wherein said first portion comprises at least one surface that is beveled.

43. The media storage device according to claim 25, wherein said first portion comprises a spacing projection.

44. The media storage device according to claim 25, wherein said first portion comprises a tenon configuration.

45. The media storage device according to claim 25, wherein said first portion comprises a tenon configuration and further comprising a second fastener portion comprising a mortise configuration.

46. The media storage device according to claim 25, wherein said media storage device is fastened to said second media storage device by relative sliding movement between said media storage device and said second media storage device.

47. The media storage device according to claim 25, wherein said media storage device is fastened to said second media storage device by interference or friction fit coupling.

* * * * *